(12) United States Patent
Ekpo, Jr.

(10) Patent No.: US 6,323,762 B1
(45) Date of Patent: Nov. 27, 2001

(54) CAR JACKING PREVENTION SYSTEM

(76) Inventor: Udo U. Ekpo, Jr., 5031 Golf Link Ct., Stone Mountain, GA (US) 30088

( * ) Notice: Subject to any disclaimer, the term of this patent is extended or adjusted under 35 U.S.C. 154(b) by 0 days.

(21) Appl. No.: 09/715,250

(22) Filed: Nov. 16, 2000

(51) Int. Cl.$^7$ .................................................. B60R 25/10
(52) U.S. Cl. .......................... 340/426; 425/541; 425/542; 425/825.54; 307/10.2; 307/10.3; 307/10.4
(58) Field of Search ................................ 340/426, 425.5, 340/541, 542, 825.54; 307/10.2, 10.3, 10.4

(56) References Cited

U.S. PATENT DOCUMENTS

| | | | |
|---|---|---|---|
| 5,638,044 | * | 6/1997 | Chua ..................................... 340/426 |
| 5,805,057 | * | 9/1998 | Eslaminovin ......................... 340/426 |
| 5,812,051 | * | 9/1998 | Talbort et al. ........................ 340/426 |
| 5,912,615 | * | 6/1999 | Kretzmar et al. .................... 340/426 |

* cited by examiner

Primary Examiner—Jeffery Hofsass
Assistant Examiner—Tai T. Nguyen
(74) Attorney, Agent, or Firm—Joseph N. Breaux

(57) ABSTRACT

A car jacking prevention system that is triggered in a number of ways and that allows a vehicle owner or driver to establish a safe distance between himself/herself and the car jacker before the car jacking prevention system triggers a number of anti-theft mechanisms. The anti-theft mechanisms include an engine cut-off mechanism, an audible alarm, a visual alarm, and a radio transmitted location system to communicate to a central location the location of the vehicle for retrieval and immediate response by police or the like. As an option, the car jacking prevention system can include a trunk activation mechanism that triggers the car jacking prevention system while simultaneously unlocking the trunk of the vehicle. Another optional mechanism is a hidden camera that, when triggered, takes multiple pictures of the car jacker while the car jacking is in progress.

16 Claims, 1 Drawing Sheet

CAR JACKING PREVENTION SYSTEM

TECHNICAL FIELD

The present invention relates to vehicle safety equipment and more particularly to a car jacking prevention system that includes a programmable control unit in controlling connection with a multi-timer unit having an output in connection with a mono-timer, an on board audio warning output system, and a manual disarm switch; the mono-timer having an activation output in electrical connection with each of the activation inputs of an engine cut-off mechanism, a hood lock assembly, an audible alarm system, a visual alarm system and a Global Positioning System tracking device with a radio communication transmitter for transmitting location data to a central tracking location; the car jacking prevention system further including a manual activation input in connection with a manual activation switch that may be hidden within a vehicle passenger compartment at a location known only to regular drivers of the vehicle, a trunk sensor activation switch that may be installed within the trunk compartment of a vehicle and that has an infrared sensor that is triggered by the body heat of a person within the trunk compartment and has an activation output in connection with a trunk sensor activation input of the control unit and an electric trunk lock opener for opening the lock of the trunk compartment, a door position sensor activation switch having a condition sensor for each passenger entry door of a vehicle and including logic circuitry in connection with each condition sensor for determining when a last condition sensor indicates the closing of a last door of a vehicle passenger compartment, and an activation output in connection with a passenger compartment entry activation input of the control unit, and a radio signal switch having a receiving antenna for receiving a radio transmitted activation signal and a radio switch activation output in connection with a radio activation input of the control unit; the radio signal switch being responsive to receipt of the radio transmitted activation signal by transmitting a system activation signal to the radio activation input of the control unit; the door position sensor activation switch generating a system activation signal to the passenger compartment entry activation input of the control unit when the logic circuitry determines a door position sensor switch indicates the closing of a last door of a vehicle passenger compartment; the trunk sensor activation switch generating a system activation signal to the trunk sensor activation input of the control unit; the manual activation switch generating a system activation signal to the control unit when depressed by a user; the control unit being programmed to trigger the multi-timer circuit upon receipt of a system activation signal; when triggered, multi-timer circuit activating on board audio warning system to audibly warn a driver of the vehicle that a car jacking prevention system has been enabled and that within a time period vehicle disabling and attention attracting events will be occurring, triggering the mono-timer, and activating the manual disarm switch which when depressed by the user before the mono-timer times out resets the control unit and thereby the car jacking prevention system; the mono-timer generating a control signal at its activation output upon timing out to simultaneously activate the engine cut-off mechanism, the hood lock assembly, the audible alarm system, the visual alarm system and the Global Positioning System tracking device with a radio communication transmitter for transmitting location data to a central tracking location.

BACKGROUND ART

Each year thousands of cars and other vehicles are car jacked. Because car jackers can be violent, it is often not a good idea to resist at the scene. It would be better, therefore, to have a car jacking prevention system that could be triggered in a number of ways that allowed the vehicle owner or driver to establish a safe distance between himself/herself and the car jacker before the car jacking prevention system triggered a number of anti theft mechanisms including an engine cut-off mechanism, an audible alarm, a visual alarm, and a radio transmitted location system to communicate to a central location the location of the vehicle for retrieval and immediate response by police or the like. Because car jackers may lock the driver of the vehicle within the vehicle trunk, it would be a further benefit to have a car jacking prevention system that included a trunk activation mechanism that triggered the car jacking prevention system while simultaneously unlocking the trunk of the vehicle. To aid in convicting the car jacker, it would be a further benefit if the car jacking prevention system also included a hidden camera for taking several pictures of the car jacker while the car jacking is in progress. It would be still a further advantage to have a car jacking prevention system that included a door monitoring mechanism for monitoring the doors of the vehicle such that when the last door of the vehicle was closed, the car jacking prevention system would be triggered by the door monitoring mechanism in a manner that would require a legitimate user of the vehicle to disarm the system by means of a hidden disarm button.

GENERAL SUMMARY DISCUSSION OF INVENTION

It is thus an object of the invention to provide a car jacking prevention system that includes a programmable control unit in controlling connection with a multi-timer unit having an output in connection with a mono-timer, an on board audio warning output system, and a manual disarm switch; the mono-timer having an activation output in electrical connection with each of the activation inputs of an engine cut-off mechanism, a hood lock assembly, an audible alarm system, a visual alarm system and a Global Positioning System tracking device with a radio communication transmitter for transmitting location data to a central tracking location; the car jacking prevention system further including a manual activation input in connection with a manual activation switch that may be hidden within a vehicle passenger compartment at a location known only to regular drivers of the vehicle, a trunk sensor activation switch that may be installed within the trunk compartment of a vehicle and that has an infrared sensor that is triggered by the body heat of a person within the trunk compartment and has an activation output in connection with a trunk sensor activation input of the control unit and an electric trunk lock opener for opening the lock of the trunk compartment, a door position sensor activation switch having a condition sensor for each passenger entry door of a vehicle and including logic circuitry in connection with each condition sensor for determining when a last condition sensor indicates the closing of a last door of a vehicle passenger compartment, and an activation output in connection with a passenger compartment entry activation input of the control unit, and a radio signal switch having a receiving antenna for receiving a radio transmitted activation signal and a radio switch activation output in connection with a radio activation input of the control unit; the radio signal switch being responsive to receipt of the radio transmitted activation signal by transmitting a system activation signal to the radio activation input of the control unit; the door position sensor activation switch generating a system activation signal to the passenger compartment entry activation input of the control unit when the logic circuitry determines a door position sensor switch indicates the closing of a last door of a vehicle passenger compartment; the trunk sensor activation switch generating a system activation signal to the trunk sensor activation input of the control unit; the manual activation switch generating a system activation signal to the control unit when depressed by a user; the control unit being programmed to trigger the multi-timer circuit upon receipt of a system activation signal; when triggered, multi-timer circuit activating on board audio warning system to audibly warn a driver of the vehicle that a car jacking prevention system has been enabled and that within a time period vehicle disabling and attention attracting events will be occurring, triggering the mono-timer, and activating the manual disarm switch which when depressed by the user before the mono-timer times out resets the control unit and thereby the car jacking prevention system; the mono-timer generating a control signal at its activation output upon timing out to simultaneously activate the engine cut-off mechanism, the hood lock assembly, the audible alarm system, the visual alarm system and the Global Positioning System tracking device with a radio communication transmitter for transmitting location data to a central tracking location.

Accordingly, a car jacking prevention system is provided. The car jacking prevention system includes a programmable control unit in controlling connection with a multi-timer unit having an output in connection with a mono-timer, an on board audio warning output system, and a manual disarm switch; the mono-timer having an activation output in electrical connection with each of the activation inputs of an engine cut-off mechanism, a hood lock assembly, an audible alarm system, and a visual alarm system; the car jacking prevention system further including a manual activation input in connection with a manual activation switch that may be hidden within a vehicle passenger compartment at a location known only to regular drivers of the vehicle and a radio signal switch having a receiving antenna for receiving a radio transmitted activation signal and a radio switch activation output in connection with a radio activation input of the control unit; the radio signal switch being responsive to receipt of the radio transmitted activation signal by transmitting a system activation signal to the radio activation input of the control unit; the manual activation switch generating a system activation signal to the control unit when depressed by a user; the control unit being programmed to trigger the multi-timer circuit upon receipt of a system activation signal; when triggered, the multi-timer circuit activating the on board audio warning system to audibly warn a driver of the vehicle that a car jacking prevention system has been enabled and that within a time period vehicle disabling and attention attracting events will be occurring, triggering the mono-timer, and activating the manual disarm switch which when depressed by the user before the mono-timer times out resets the control unit and thereby the car jacking prevention system; the mono-timer generating a control signal at its activation output upon timing out to simultaneously activate the engine cut-off mechanism, the hood lock assembly, the audible alarm system, and the visual alarm system.

In various preferred embodiments the car jacking prevention system includes alone or in combination a Global Positioning System tracking device with a radio communication transmitter for transmitting location data to a central tracking location that is activated by the activation output of the mono-timer; a trunk sensor activation switch that may be installed within the trunk compartment of a vehicle and that has infrared trigger that is triggered by the body heat of a person within the trunk compartment and has an activation output in connection with a trunk sensor activation input of the control unit and an electric trunk lock opener for opening the lock of the trunk compartment, the trunk sensor activation switch generating a system activation signal to the trunk sensor activation input of the control unit; a door position sensor activation switch having a condition sensor for each passenger entry door of a vehicle and including logic circuitry in connection with each condition sensor for determining when a last condition sensor indicates the closing of a last door of a vehicle passenger compartment, and an activation output in connection with a passenger compartment entry activation input of the control unit, the door position sensor activation switch generating a system activation signal to the passenger compartment entry activation input of the control unit when the logic circuitry determines a door position sensor switch indicates the closing of a last door of a vehicle passenger compartment; a hidden camera having a trigger input for triggering a multi-picture taking sequence that is activated by the control signal generated by the mono-timer activation output.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
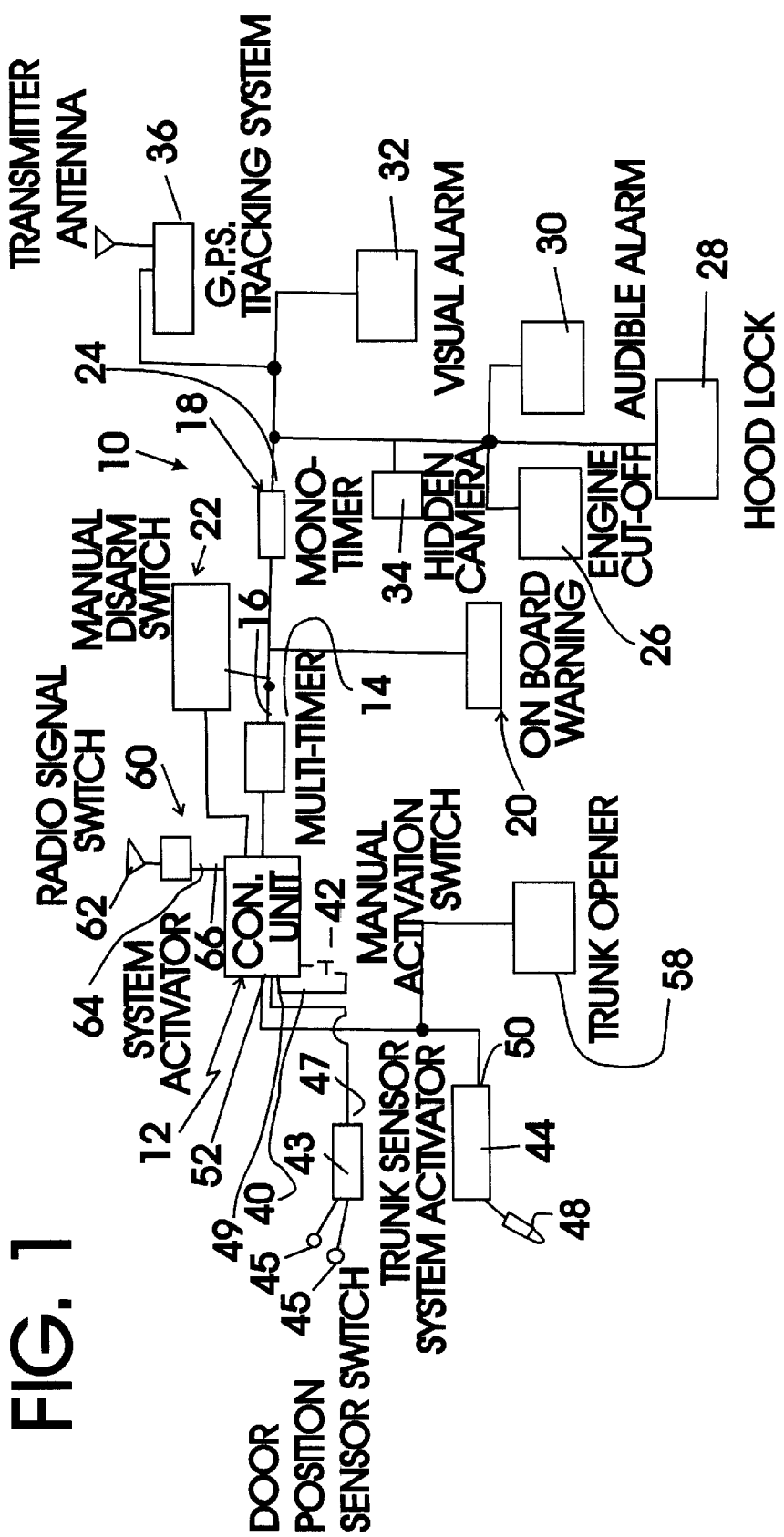
FIG. 1 is a schematic diagram of the car jacking prevention system of the present invention.

FIG. 1 is a schematic diagram of an exemplary embodiment of the car jacking prevention system of the present invention generally designated 10. Car jacking prevention system 10 includes a programmable control unit, generally designated 12, in controlling connection with a multi-timer unit, generally designated 14, having an output 16 in connection with a mono-timer, generally designated 18, an on board audio warning output system, generally designated 20, and a manual disarm switch generally designated 22.

Mono-timer 18 has an activation output 24 in electrical connection with each of the activation inputs of an engine cut-off mechanism 26, a hood lock assembly 28, an audible alarm system 30, a visual alarm system 32, a hidden camera 34 and a Global Positioning System tracking device 36 with a radio communication transmitter for transmitting location data to a central tracking location.

Car jacking prevention system 10 also includes a manual activation input 40 in connection with a manual activation switch 42 that may be hidden within a vehicle passenger compartment at a location known only to regular drivers of the vehicle; a trunk sensor activation switch 44 that may be installed within the trunk compartment of a vehicle and that has an infrared input sensor 48 that is triggered by the body heat of a person within the trunk compartment and has an activation output 50 in connection with a trunk sensor activation input 52 of control unit 12 and an electric trunk lock opener 58 for opening a lock of a trunk compartment of the vehicle within which the system 10 is installed; a door position sensor activation switch 43 having a condition sensor 45 for each passenger entry door of a vehicle and including logic circuitry in connection with each condition sensor 45 for determining when a last condition sensor 45 indicates the closing of a last door of a vehicle passenger compartment, and an activation output 47 in connection with a passenger compartment entry activation input 49 of control unit 12; and a radio signal switch, generally designated 60, having a receiving antenna 62 for receiving a radio transmitted activation signal and a radio switch activation output 64 in connection with a radio activation input 66 of control unit 12. Radio signal switch 60 is responsive to receipt of the radio transmitted activation signal by transmitting a system activation signal to radio activation input 66 of control unit 12.

In use, trunk sensor activation switch 44 generates a system activation signal to the trunk sensor activation input 52 of control unit 12, door position sensor activation switch 43 generates a system activation signal to passenger compartment entry activation input 49 of control unit 12 when the logic circuitry determines a door position sensor switch 45 indicates the closing of a last door of a vehicle passenger compartment, and manual activation switch 42 generates a system activation signal to the control unit 12 when depressed by a user. Control unit 12 is programmed to trigger multi-timer circuit 14 upon receipt of a system activation signal from any or all of radio signal switch 60, trunk sensor activation switch 44, the door position activation switch 43 and/or manual activation switch 42. When triggered, multi-timer circuit 14 a) activates on board audio warning system to audibly warn a driver of the vehicle that a car jacking prevention system has been enabled and that within a brief time period a number of vehicle disabling and attention attracting events will be occurring; b) triggers mono-timer 18, and c) activates manual disarm switch 22 which when depressed by the user before mono-timer 18 times out resets control unit 12 and, thereby, car jacking prevention system 10.

After timing out, mono-timer 18 generates a control signal at its activation output 24 to simultaneously activate engine cut-off mechanism 26, hood lock assembly 28, audible alarm system 30, visual alarm system 32, hidden camera 34, and Global Positioning System tracking device 36. Engine cut-off mechanism 26, hood lock assembly 28, audible alarm system 30, visual alarm system 32, hidden camera 34, and Global Positioning System tracking device 36 are all commercially available, conventional electrically powered and activated mechanisms.

It can be seen from the preceding description that a car jacking prevention system has been provided.

It is noted that the embodiment of the car jacking prevention system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A car jacking prevention system comprising:
    a programmable control unit in controlling connection with:
        a multi-timer unit having an output in connection with a mono-timer, an on board audio warning output system, and a manual disarm switch; and
        a mono-timer having an activation output in electrical connection with each of the activation inputs of an engine cut-off mechanism, a hood lock assembly, an audible alarm system, and a visual alarm system;
    the car jacking prevention system further including:
        a manual activation input in connection with a manual activation switch that may be hidden within a vehicle passenger compartment at a location known only to regular drivers of the vehicle, and
        a radio signal switch having a receiving antenna for receiving a radio transmitted activation signal and a radio switch activation output in connection with a radio activation input of the control unit;
        the radio signal switch being responsive to receipt of the radio transmitted activation signal by transmitting a system activation signal to the radio activation input of the control unit;
        the manual activation switch generating a system activation signal to the control unit when depressed by a user;
        the control unit being programmed to trigger the multi-timer circuit upon receipt of a system activation signal;
        when triggered, the multi-timer circuit activating the on board audio warning system to audibly warn a driver of the vehicle that a car jacking prevention system has been enabled and that within a time period vehicle disabling and attention attracting events will be occurring, triggering the mono-timer, and activating the manual disarm switch which when depressed by the user before the mono-timer times out resets the control unit and thereby the car jacking prevention system;
        the mono-timer generating a control signal at its activation output upon timing out to simultaneously activate the engine cut-off mechanism, the hood lock assembly, the audible alarm system, and the visual alarm system.

2. The car jacking prevention system of claim 1 further comprising:
    a Global Positioning System tracking device with a radio communication transmitter for transmitting location data to a central tracking location that is activated by the activation output of the mono-timer.

3. The car jacking prevention system of claim 2 further comprising:
    a trunk sensor activation switch installable within a trunk compartment of a vehicle and having infrared trigger that is triggered by the body heat of a person within the trunk compartment and an activation output in connection with a trunk sensor activation input of the control unit and an electric trunk lock opener for opening a lock of a vehicle trunk compartment;
    when the infrared trigger is triggered, the trunk sensor activation switch generating a system activation signal to the trunk sensor activation input of the control unit.

4. The car jacking prevention system of claim 3 further comprising:
    a hidden camera having a trigger input for triggering a multi-picture taking sequence that is activated by the control signal generated by the mono-timer activation output.

5. The car jacking prevention system of claim 4 further comprising:
    a door position sensor activation switch having a condition sensor for each passenger entry door of a vehicle and including logic circuitry in connection with each condition sensor for determining when a last condition sensor indicates the closing of a last door of a vehicle passenger compartment, and an activation output in connection with a passenger compartment entry activation input of the control unit, the door position sensor activation switch generating a system activation signal to the passenger compartment entry activation input of the control unit when the logic circuitry determines a door position sensor switch indicates the closing of a last door of a vehicle passenger compartment.

6. The car jacking prevention system of claim 3 further comprising:

a door position sensor activation switch having a condition sensor for each passenger entry door of a vehicle and including logic circuitry in connection with each condition sensor for determining when a last condition sensor indicates the closing of a last door of a vehicle passenger compartment, and an activation output in connection with a passenger compartment entry activation input of the control unit, the door position sensor activation switch generating a system activation signal to the passenger compartment entry activation input of the control unit when the logic circuitry determines a door position sensor switch indicates the closing of a last door of a vehicle passenger compartment.

7. The car jacking prevention system of claim 2 further comprising:

a hidden camera having a trigger input for triggering a multi-picture taking sequence that is activated by the control signal generated by the mono-timer activation output.

8. The car jacking prevention system of claim 7 further comprising:

a door position sensor activation switch having a condition sensor for each passenger entry door of a vehicle and including logic circuitry in connection with each condition sensor for determining when a last condition sensor indicates the closing of a last door of a vehicle passenger compartment, and an activation output in connection with a passenger compartment entry activation input of the control unit, the door position sensor activation switch generating a system activation signal to the passenger compartment entry activation input of the control unit when the logic circuitry determines a door position sensor switch indicates the closing of a last door of a vehicle passenger compartment.

9. The car jacking prevention system of claim 2 further comprising:

a door position sensor activation switch having a condition sensor for each passenger entry door of a vehicle and including logic circuitry in connection with each condition sensor for determining when a last condition sensor indicates the closing of a last door of a vehicle passenger compartment, and an activation output in connection with a passenger compartment entry activation input of the control unit, the door position sensor activation switch generating a system activation signal to the passenger compartment entry activation input of the control unit when the logic circuitry determines a door position sensor switch indicates the closing of a last door of a vehicle passenger compartment.

10. The car jacking prevention system of claim 1 further comprising:

a trunk sensor activation switch installable within a trunk compartment of a vehicle and having infrared trigger that is triggered by the body heat of a person within the trunk compartment and an activation output in connection with a trunk sensor activation input of the control unit and an electric trunk lock opener for opening a lock of a vehicle trunk compartment;

when the infrared trigger is triggered, the trunk sensor activation switch generating a system activation signal to the trunk sensor activation input of the control unit.

11. The car jacking prevention system of claim 10 further comprising:

a hidden camera having a trigger input for triggering a multi-picture taking sequence that is activated by the control signal generated by the mono-timer activation output.

12. The car jacking prevention system of claim 11 further comprising:

a door position sensor activation switch having a condition sensor for each passenger entry door of a vehicle and including logic circuitry in connection with each condition sensor for determining when a last condition sensor indicates the closing of a last door of a vehicle passenger compartment, and an activation output in connection with a passenger compartment entry activation input of the control unit, the door position sensor activation switch generating a system activation signal to the passenger compartment entry activation input of the control unit when the logic circuitry determines a door position sensor switch indicates the closing of a last door of a vehicle passenger compartment.

13. The car jacking prevention system of claim 10 further comprising:

a door position sensor activation switch having a condition sensor for each passenger entry door of a vehicle and including logic circuitry in connection with each condition sensor for determining when a last condition sensor indicates the closing of a last door of a vehicle passenger compartment, and an activation output in connection with a passenger compartment entry activation input of the control unit, the door position sensor activation switch generating a system activation signal to the passenger compartment entry activation input of the control unit when the logic circuitry determines a door position sensor switch indicates the closing of a last door of a vehicle passenger compartment.

14. The car jacking prevention system of claim 1 further comprising:

a hidden camera having a trigger input for triggering a multi-picture taking sequence that is activated by the control signal generated by the mono-timer activation output.

15. The car jacking prevention system of claim 14 further comprising:

a door position sensor activation switch having a condition sensor for each passenger entry door of a vehicle and including logic circuitry in connection with each condition sensor for determining when a last condition sensor indicates the closing of a last door of a vehicle passenger compartment, and an activation output in connection with a passenger compartment entry activation input of the control unit, the door position sensor activation switch generating a system activation signal to the passenger compartment entry activation input of the control unit when the logic circuitry determines a door position sensor switch indicates the closing of a last door of a vehicle passenger compartment.

16. The car jacking prevention system of claim 1 further comprising:

a door position sensor activation switch having a condition sensor for each passenger entry door of a vehicle and including logic circuitry in connection with each condition sensor for determining when a last condition sensor indicates the closing of a last door of a vehicle passenger compartment, and an activation output in connection with a passenger compartment entry activation input of the control unit, the door position sensor activation switch generating a system activation signal to the passenger compartment entry activation input of the control unit when the logic circuitry determines a door position sensor switch indicates the closing of a last door of a vehicle passenger compartment.

\* \* \* \* \*